(12) United States Patent
Brück et al.

(10) Patent No.: US 12,168,203 B2
(45) Date of Patent: Dec. 17, 2024

(54) EXHAUST GAS AFTERTREATMENT DEVICE

(71) Applicant: Vitesco Technologies GMBH, Regensburg (DE)

(72) Inventors: Rolf Brück, Bergisch Gladbach (DE); Peter Hirth, Rösrath (DE); Sven Schepers, Troisdorf (DE); David Odenthal, Bergisch Gladbach (DE)

(73) Assignee: Vitesco Technologies GmbH, Regensburg (DE)

( * ) Notice: Subject to any disclaimer, the term of this patent is extended or adjusted under 35 U.S.C. 154(b) by 461 days.

(21) Appl. No.: 17/553,065

(22) Filed: Dec. 16, 2021

(65) Prior Publication Data
US 2022/0105465 A1 Apr. 7, 2022

Related U.S. Application Data

(63) Continuation of application No. PCT/EP2020/067594, filed on Jun. 24, 2020.

(30) Foreign Application Priority Data

Jun. 26, 2019 (DE) .................. 10 2019 209 301.9

(51) Int. Cl.
*B01D 53/94* (2006.01)
*F01N 3/20* (2006.01)
*F01N 3/28* (2006.01)

(52) U.S. Cl.
CPC ............ *B01D 53/94* (2013.01); *F01N 3/2026* (2013.01); *F01N 3/2803* (2013.01); *F01N 2510/00* (2013.01)

(58) Field of Classification Search
CPC ..... B01D 53/94; F01N 3/2026; F01N 3/2803; F01N 3/2006; F01N 3/281; F01N 3/08;
(Continued)

(56) References Cited

U.S. PATENT DOCUMENTS 3,744,249 A * 7/1973 August .................. F01B 3/10
422/174
5,569,455 A * 10/1996 Fukui ..................... B01J 35/33
422/174
(Continued)

FOREIGN PATENT DOCUMENTS

CN 102465746 A 5/2012
CN 208380672 U 1/2019
(Continued)

OTHER PUBLICATIONS

International Search Report and Written Opinion dated Aug. 3, 2020 from corresponding International Patent Application No. PCT/EP2020/067594.
(Continued)

*Primary Examiner* — Dapinder Singh

(57) ABSTRACT

A device for exhaust-gas aftertreatment, such as an annular catalytic converter, having a first, tubular flow path, having a diverting chamber and having a second, annular flow path, wherein the tubular flow path is delimited outwardly in the radial direction by an inner pipe and the second, annular flow path is delimited inwardly in the radial direction by the inner pipe and outwardly in the radial direction by an outer pipe, and the diverting chamber is designed to divert the exhaust-gas flow from the tubular flow path (8) into the annular flow path, wherein the annular catalytic converter has at least one annular substrate body which has a catalytically active coating applied to it and which is arranged in the annular flow path.

12 Claims, 2 Drawing Sheets

(58) Field of Classification Search
CPC ...... F01N 3/2066; F01N 3/035; F01N 3/0814; F01N 3/021; F01N 3/0222; F01N 3/101; F01N 3/2892; F01N 3/2828; F01N 2510/00; F01N 2510/06; F01N 2240/16; F01N 2240/20; F01N 2330/02; F01N 2330/38; F01N 2330/06; F01N 2470/22; F01N 2470/24; F01N 13/0097; F01N 13/0093; F01N 13/08; F01N 2610/14; F01N 2250/02; Y02A 50/20; Y02T 10/12; Y02T 10/40

See application file for complete search history.

(56) References Cited

U.S. PATENT DOCUMENTS

| | | | |
|---|---|---|---|
| 5,634,331 | A | 6/1997 | Aoki et al. |
| 6,620,391 | B2* | 9/2003 | Muller ................ F01N 13/0097 423/247 |
| 8,015,802 | B2* | 9/2011 | Nishiyama ............ F01N 3/0233 60/296 |
| 8,950,175 | B2 | 2/2015 | Laurell et al. |
| 8,978,366 | B2* | 3/2015 | Brugger ................ F01N 13/009 60/296 |
| 9,322,309 | B2* | 4/2016 | Beyer ....................... F01N 3/20 |
| 2006/0008397 | A1* | 1/2006 | Bruck .................... F01N 13/14 422/177 |
| 2008/0066451 | A1 | 3/2008 | Warner et al. |
| 2009/0074630 | A1* | 3/2009 | Gonze ................... F01N 13/009 422/174 |
| 2010/0212301 | A1* | 8/2010 | De Rudder ............ B01D 53/92 60/299 |
| 2010/0263352 | A1* | 10/2010 | Hylands ............. F02M 21/0227 60/303 |
| 2012/0110989 | A1 | 5/2012 | Laurell |

FOREIGN PATENT DOCUMENTS

| | | |
|---|---|---|
| DE | 102017201468 A1 | 8/2018 |
| DE | 102017111125 A1 | 11/2018 |
| EP | 2453113 A1 | 5/2012 |
| JP | H04131138 A | 5/1992 |
| JP | 2002070534 A | 3/2002 |
| JP | 2006515401 A | 5/2006 |
| JP | 2016186229 A | 10/2016 |
| WO | 9012950 A1 | 11/1990 |
| WO | 9701387 A1 | 1/1997 |
| WO | 2004063540 A1 | 7/2004 |

OTHER PUBLICATIONS

Chinese Office Action dated Aug. 9, 2023 for corresponding Patent Application No. 202080043233.3.

Japanese Office Action dated Feb. 7, 2023 for corresponding Patent Application No. 2021-576955.

* cited by examiner

EXHAUST GAS AFTERTREATMENT DEVICE

CROSS-REFERENCE TO RELATED APPLICATIONS

This application claims priority to PCT Application PCT/EP2020/067594, filed Jun. 24, 2020, which claims priority to German Patent Application No. DE 10 2019 209 301.9, filed Jun. 26, 2019. The disclosures of the above applications are incorporated herein by reference.

FIELD OF THE INVENTION

The invention relates to a device for exhaust-gas aftertreatment, such as an annular catalytic converter, having a first, tubular flow path, having a diverting chamber and having a second, annular flow path, wherein the tubular flow path is delimited outwardly in the radial direction by an inner pipe and the second, annular flow path is delimited inwardly in the radial direction by the inner pipe and outwardly in the radial direction by an outer pipe, and the diverting chamber is designed to divert the exhaust-gas flow from the tubular flow path into the annular flow path.

BACKGROUND OF THE INVENTION

In order to ensure the fastest and most efficient exhaust-gas aftertreatment possible, it is necessary for the so-called light-off temperature, proceeding from which the catalytically active coatings on the substrate bodies of catalytic converters impart their full action, to be reached as quickly as possible. The chemical reaction of the respective pollutants from the exhaust gases of an internal combustion engine on the catalytic converters can begin only when this temperature has been reached. Therefore, catalytic converters are advantageously arranged close to the source of the exhaust gases in order to generate high exhaust-gas temperatures, and thus also high temperatures at the catalytic converters themselves, as quickly as possible.

As an alternative to positioning close to the exhaust-gas source, for example directly downstream of a turbocharger which is driven by the exhaust gas of an internal combustion engine, or in addition to this, electrically heated components may be used to increase the exhaust-gas temperature by way of the electrical additional heating.

A disadvantage of the arrangement of catalytic converters directly downstream of a turbocharger is in particular that the flow distribution over the cross section of the path through which the exhaust gas flows is not optimal immediately downstream of a turbocharger, which means that the exhaust-gas aftertreatment in a downstream catalytic converter cannot be optimal either.

In particular if a so-called annular catalytic converter is used which has firstly a tubular flow path followed by a diverting chamber and subsequently an annular flow path, a further drop in temperature occurs at least in the region of the tubular flow path and of the diverting chamber, such that the exhaust-gas temperature at the actual catalytic converter substrate is considerably lower. The advantage of better mixing within the tubular flow path of the annular catalytic converter is thus offset by the drop in the exhaust-gas temperature.

SUMMARY OF THE INVENTION

It is therefore the object of the present invention to create a device for exhaust-gas aftertreatment which leads both to improved mixing of the flowing exhaust gas and to a less pronounced decrease in the exhaust-gas temperature, or even to an active increase in the exhaust-gas temperature.

The object relating to the device is achieved by a device having the features described herein.

One exemplary embodiment of the invention relates to a device for exhaust-gas aftertreatment, which in an embodiment is an annular catalytic converter, having a first, tubular flow path, having a diverting chamber and having a second, annular flow path, wherein the tubular flow path is delimited outwardly in the radial direction by an inner pipe and the second, annular flow path is delimited inwardly in the radial direction by the inner pipe and outwardly in the radial direction by an outer pipe, and the diverting chamber is designed to divert the exhaust-gas flow from the tubular flow path into the annular flow path, wherein the annular catalytic converter has at least one annular substrate body which has a catalytically active coating applied to it and which is arranged in the annular flow path.

The basic construction of an annular catalytic converter is known from the prior art. The main features are the tubular flow path in the center of the annular catalytic converter, which allows improved mixing of the exhaust-gas flow. In the case of a diesel engine as exhaust-gas source, this flow path is utilized for example for mixing the exhaust gas with a vaporized urea solution in order to subsequently allow more uniform impingement on the catalytically active substrate bodies of the catalysts arranged in the annular catalytic converter.

The exhaust gas flows out of the tubular flow path through a diverting chamber, in which the exhaust gas is diverted radially outward, and the exhaust gas finally flows through the annular flow path in a flow direction opposite to the flow in the tubular flow path. In some embodiments, annular catalytic converters have short installation length in relation to the actual length of the flow path in the interior.

A wide variety of catalysts may be arranged in the flow paths, which are designed for the reaction of different constituents of the exhaust gas depending on the type of exhaust gas.

The substrate bodies of the catalytic converters may for example be metallic and be formed from stacked and wound metal foils. The use of coated ceramic materials is also possible.

In an embodiment, the substrate body is produced from a multiplicity of metal foils, and a multiplicity of flow channels through which flow may pass along the flow direction is formed between the metal foils. The multiplicity of flow channels generates an active surface that is as large as possible over which the exhaust gas may flow.

In an embodiment, at least some of the metal foils have cutouts, whereby flow transfer passages are formed between mutually adjacent flow channels. Cutouts may for example be perforations in the metal foils. Stamped protuberances and profiles may also be provided at the edges of the cutouts, which promote a transfer flow of the exhaust gas between mutually adjacent flow channels.

The cutouts additionally substantially reduce the thermal mass of the substrate body, whereby heating of the substrate body to the light-off temperature is accelerated.

An embodiment is characterized in that the substrate body is formed from at least partially structured metal foils and smooth metal foils, which are stacked one on top of the other and wound up. In this embodiment, the production of substrate bodies in this way is widely known and thus a large number of different substrate bodies tailored to the respective application are produced in a simple manner.

In an embodiment, the cutouts in the metal foils are arranged at that end region of the substrate body which faces toward the diverting chamber. In that region of the substrate body in which the exhaust-gas flows into the flow channels, a low heat capacity leads to rapid heating. This ensures that the light-off temperature is reached as quickly as possible.

In an embodiment, an electrically heatable heating disk is arranged in the annular flow path. An electrically heatable heating disk may for example likewise be a metallic substrate body that is formed from metal foils. In addition, the heating disk has one or more electrical conductors which are connected to a voltage source and which may thus contribute to heating the substrate body through utilization of the electrical resistance. The electrical conductors may be wound between the metal foils of the substrate body or, for example, attached to the inflow side of the heating disk.

In an embodiment, the electrically heatable heating disk is positioned upstream of the substrate body in the flow direction of the exhaust gas. This achieves a temperature increase in the flowing exhaust gas to the greatest possible extent upstream of the catalytically active substrate body.

It is also expedient if the outer pipe of the annular catalytic converter, or the jacket in which the outer pipe is received, has a heating element. Such a heating element serves for heating the annular catalytic converter from the outside and for transferring energy from the jacket and/or the outer pipe to the exhaust gas by thermal radiation.

In an embodiment, the heating element is formed by a heating coil which is wound around the jacket or the outer pipe. In another embodiment, a heating coil is formed by a current-carrying conductor that is wound around the outer pipe or the jacket. In this way, the outer pipe or the jacket is heated in a targeted manner as required, and the heat is released in the interior to the flowing exhaust gas and/or to the substrate body by thermal radiation and thermal conduction.

In an embodiment, the heating element is formed by a multiplicity of heating devices which are arranged so as to be distributed along the circumference of the jacket or of the outer pipe. For example, PTC heating elements may be provided, which are arranged in a distributed manner on the outer pipe or the jacket and which thus generate heating of the respective structure.

Advantageous developments of the present invention are described in the following description of the Figures.

BRIEF DESCRIPTION OF THE DRAWINGS

The invention will be discussed in more detail below on the basis of exemplary embodiments with reference to the drawings. In the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
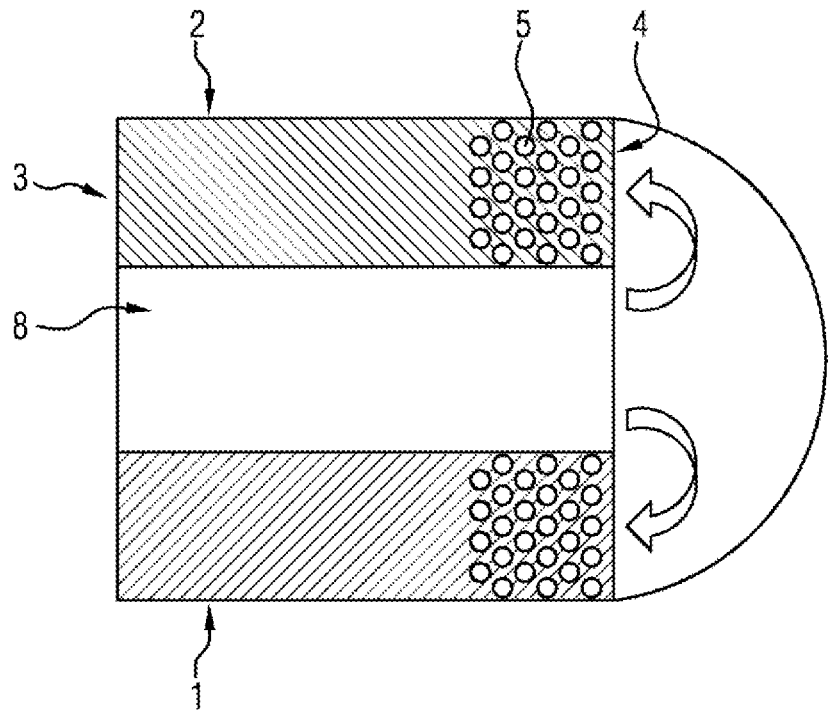
FIG. 1 shows a sectional view through an annular catalytic converter, wherein the substrate body has a perforation in the annular flow path at its inflow side.

FIG. 1 shows a sectional view through an annular catalytic converter 1, wherein the substrate body 3 arranged in the annular flow path 2 has a plurality of cutouts 5 at its gas inflow side 4. Because of the cutouts 5, which are for example made in the individual metal foils from which the substrate body 3 is formed, the heat capacity of the substrate body 3 is reduced, which allows faster heating and thus makes it possible for the light-off temperature to be reached more quickly.

Figure 2:
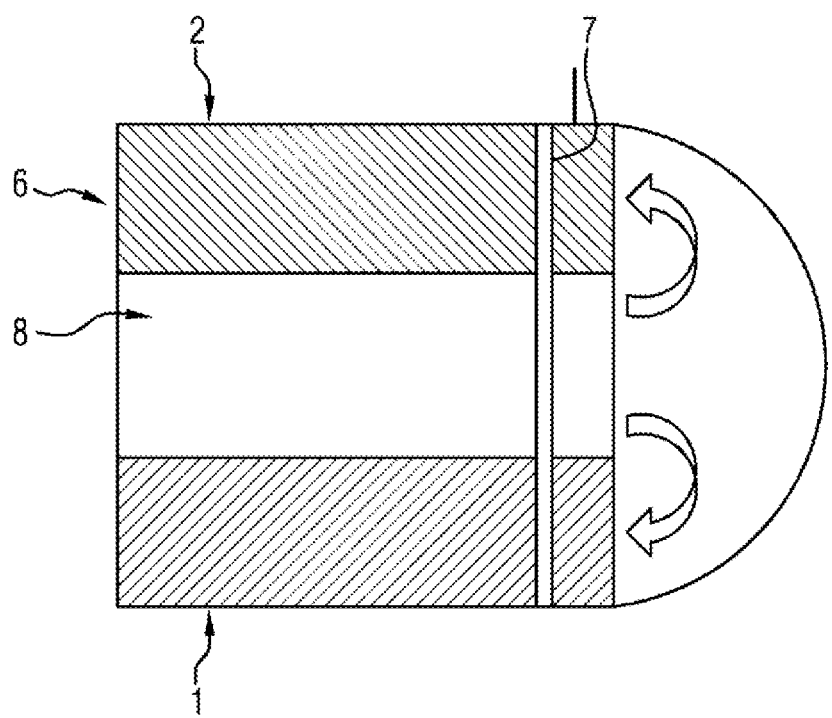
FIG. 2 shows a sectional view through an annular catalytic converter, wherein a heating disk is positioned upstream of the annular substrate body as viewed in the flow direction.

FIG. 2 shows an annular catalytic converter 1 as has already been shown in FIG. 1 In this exemplary embodiment, an electrically heatable heating disk 7 is positioned upstream of the substrate body 6.

The heating disk 7 may be arranged entirely in the annular flow path 2, or else somewhat upstream thereof in the diverting chamber, and, by way of its own structure, lengthen both the tubular flow path 8 and the annular flow path 2.

The heating disk 7 may be connected to a voltage source via an electrical contact arrangement (not shown) and may thus be electrically heated.

Figure 3:
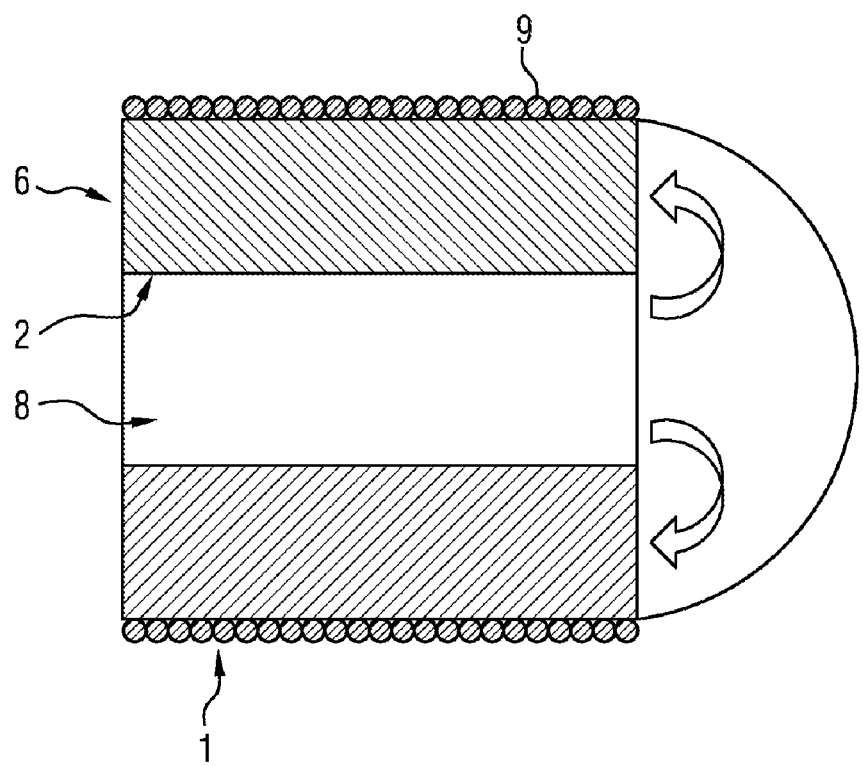
FIG. 3 shows a sectional view through an annular catalytic converter, wherein a heating coil is wound around the outer pipe.

FIG. 3 shows an annular catalytic converter 1 as in the preceding FIGS. 1 and 2, wherein a heating coil 9 has now been wound around the outer pipe or the outer jacket of the annular catalytic converter 1. This heating coil 9 may for example be formed by a heating conductor.

As shown in FIG. 3, the heating coil 9 may be arranged along the entire axial extent of the annular flow path 2, such that heating from the outside is achieved over the entire length. Alternatively, only a partial region may be enwound by the heating coil. In an embodiment, the gas inlet side of the substrate body 3 is enwound in such a case.

The different features of the individual exemplary embodiments may also be combined with one another. Accordingly, the features shown in FIGS. 1, 2 and 3 may also be combined in a common exemplary embodiment, such that the heating coil on the outer pipe interacts with the electrical heating disk and the cutouts in the metal foils of the substrate body. Any other combination of the individual exemplary embodiments is also possible according to the invention.

The exemplary embodiments in FIGS. 1 to 3 are not of a limiting nature and serve for illustrating the concept of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for exhaust-gas aftertreatment comprising:
   an inner pipe;
   a tubular flow path is delimited outwardly in the radial direction by the inner pipe;
   an outer pipe;
   an annular flow path is delimited inwardly in the radial direction by the inner pipe and outwardly in the radial direction by the outer pipe;
   a diverting chamber which diverts the exhaust-gas flow from the tubular flow path into the annular flow path;
   at least one annular substrate body arranged in the annular flow path; and
   a catalytically active coating applied to the at least one annular substrate body;
   an electrically heatable heating disk arranged in the annular flow path and the tubular flow path.

2. The device of claim 1, the substrate body further comprising:
a multiplicity of metal foils; and
a multiplicity of flow channels formed between the multiplicity of metal foils;
wherein flow passes through the multiplicity of flow channels in the flow direction.

3. The device of claim 2, at least some of the multiplicity of metal foils further comprising cutouts, forming flow transfer passages between the multiplicity of flow channels which are mutually adjacent to one another.

4. The device of claim 3, wherein the cutouts formed in the multiplicity of metal foils are arranged at the end region of the substrate body which faces toward the diverting chamber.

5. The device of claim 1, the substrate body further comprising at least partially structured metal foils and smooth metal foils, which are stacked one on top of the other and wound up.

6. The device of claim 1, wherein the electrically heatable heating disk is positioned upstream of the substrate body in the flow direction of the exhaust gas.

7. The device of claim 1, the outer pipe further comprising a heating element.

8. The device of claim 7, the heating element further comprising a heating coil which is wound around the outer pipe.

9. The device of claim 7, the heating element further comprising a multiplicity of heating devices which are arranged so as to be distributed along the circumference of the outer pipe.

10. The device of claim 1, further comprising a jacket in which the outer pipe is received, the jacket having a heating element.

11. The device of claim 10, the heating element further comprising a heating coil which is wound around the jacket.

12. The device of claim 10, the heating element further comprising a multiplicity of heating devices which are arranged so as to be distributed along the circumference of the jacket.

* * * * *